(12) United States Patent
Lagnier et al.

(10) Patent No.: US 6,461,135 B1
(45) Date of Patent: Oct. 8, 2002

(54) TREAD MOLD

(75) Inventors: Alain Lagnier, Romagnat (FR); José Merino Lopez, Riom (FR); Georges Lavialle, Billom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/722,771

(22) Filed: Nov. 27, 2000

(30) Foreign Application Priority Data

Nov. 25, 1999 (FR) .............................................. 99 14956

(51) Int. Cl.[7] .............................................. B29D 30/68
(52) U.S. Cl. ........................ 425/28.1; 425/46; 425/438; 425/DIG. 58; 152/DIG. 3
(58) Field of Search ........................ 425/28.1, 35, 37, 425/46, 438, DIG. 58; 152/DIG. 3

(56) References Cited

U.S. PATENT DOCUMENTS

| | | | |
|---|---|---|---|
| 1,733,064 A | | 10/1929 | Lambert |
| 5,800,642 A | * | 9/1998 | Ohya ........................ 425/28.1 |
| 5,950,700 A | * | 9/1999 | Fukuoka .................... 425/28.1 |
| 6,143,223 A | | 11/2000 | Merino Lopez |
| 6,193,492 B1 | * | 2/2001 | Lagnier et al. ................ 425/46 |
| 6,318,983 B1 | * | 11/2001 | Lopez et al. .................. 425/46 |

FOREIGN PATENT DOCUMENTS

| | | |
|---|---|---|
| DE | 4130143 | 3/1993 |
| EP | 0925907 | 6/1999 |
| FR | 2759323 | 8/1998 |

* cited by examiner

Primary Examiner—James P. Mackey
(74) Attorney, Agent, or Firm—Baker Botts L.L.P.

(57) ABSTRACT

A mold for molding a tread, in particular of a tire, having first elements in relief and second elements in relief for cooperating in the molding configuration to form a molding element intended to mold a single cutout opening both on to the running surface of the tread and on to one of the lateral edges of said tread and to define at least one orifice intended to allow the rubber mix to pass during the molding of the tread.

6 Claims, 3 Drawing Sheets

TREAD MOLD

BACKGROUND OF THE INVENTION

The invention relates to molds for molding tread patterns for the treads of tires and in particular to molds for molding in a tread pattern motif at least one cutout, part of which is located beneath the running surface and opens on to at least one lateral face of said tread pattern motif.

In order to impart adhesion performance to a tread, it is known to form a tread pattern formed of motifs in relief on the surface of said tread which is intended to be in contact with the ground during travel. These motifs are defined by the cutouts (notches or grooves of a width of greater than 2 mm) which are produced by molding by means of elements in relief which are borne by a mold which is furthermore intended to vulcanize the rubber mixes comprising said tread. Furthermore, it is known to form, during the molding phase or alternatively by cutting-out after said molding phase, a plurality of incisions (cutouts of average width less than 2 mm) in the motifs in relief of the tread pattern so as to create a large number of rubber ridges to cut the film of water which may be present in the zone of contact.

Obtaining good adhesion performance of the tire on wet ground requires a very large number of cutouts (grooves and/or incisions) to be produced, which is incompatible with maintaining a sufficient level of rigidity of the motifs in relief of a tread pattern to withstand the forces exerted by the ground during contact. This is why it was proposed, in application WO 98/35842, producing a plurality of cutouts provided on the walls defining each of said cutouts of at least one rubber connecting element connecting said walls to each other. One embodiment has been proposed which consists of incorporating in the tire in the non-vulcanized state spacers which are provided with at least one hole for allowing the rubber mix to pass through during the molding operation and thus to form at least one connecting element. One disadvantage of this method resides in the fact that the incision after molding and vulcanization remains filled with the material forming the spacer. There is therefore no possibility of evacuating the water picked up during travel on wet ground.

In order to minimize the risks of formation of a fissure at the bottom of the incision, it is known, for example from U.S. Pat. No. 2,121,955, to mold a transverse channel beneath the running surface, this channel being located in the extension of each incision. One form of embodiment proposed consists in molding each channel by means of a needle during molding of the tire, which needle is introduced transversely and beneath the tread to be molded, and finally producing the incisions by connecting each incision to a channel.

Another form of embodiment consists in using molding elements formed of two assembled parts, one part molding an incision and another part molding a channel in the extension of the incision. However, in this latter case, the incision must itself open out laterally to permit demolding of these molding elements.

There has been discovered a need to be able to provide a means for molding a tread pattern in which at least some motifs in relief are defined by lateral faces and provided with cutouts (grooves and/or incisions) which open at least partially on to at least one of said lateral faces to enable said cutouts to communicate with at least one cutout adjacent said motifs, said cutouts furthermore having their main facing walls connected by at least one connecting element of rubber mix.

SUMMARY OF THE INVENTION

One object of the present invention is to propose a mold for molding a tire comprising a tread provided with a tread pattern formed of motifs in relief defined by cutouts, each motif in relief comprising at least two lateral faces spaced apart in the axial direction of the tire and a contact face forming part of the running surface of said tire.

At least one motif in relief comprises a cutout which opens both on to the running surface of the tread when new and on to at least one of the lateral faces of said motif, the main facing walls of this cutout being connected by at least one connecting element of rubber mix, the contour of the section of intersection of which with at least one of the main facing walls does not touch the bottom of the cutout.

The tire mold according to the invention, which is intended to mold a tire provided with a tread of rubber mix and having a running surface and two lateral faces axially defining said tread, comprises in the molding configuration:

- a peripheral ring formed of sectors having a molding surface intended to mold at least the running surface of the tread, each sector being able to be moved in a movement towards or away from the axis of the mold,
- two shells concentric to the peripheral ring, each having a molding surface intended to mold a lateral face of the tread, these shells being able to be moved in a movement in the direction of the axis of the mold which tends to move them towards or away from each other,
- at least one first element in relief which projects from the molding surface of at least one of said shells for molding a channel beneath the running surface of the tread,
- at least one second element in relief which projects from the molding surface of a sector of the ring for molding a cutout in the tread.

This mold, in the molding position, is characterized in that at least one first element in relief borne by a shell cooperates with at least one second element in relief borne by a sector to form a molding element intended to mold in at least one motif in relief of the tread pattern a cutout opening on to the running surface of the tread, said cutout being extended to the inside of the tread by a channel opening on to at least one lateral face of the motif in relief in question, said first and second elements in relief being functionally arranged to define at least one orifice which is entirely defined by said first and second elements in relief. Each orifice thus formed by the mold in the molding configuration is intended to allow the rubber mix to pass during molding for molding a connecting element connecting the main walls defining the cutout molded with said molding element.

A mold according to the invention permits easy molding of a cutout which opens on to the running surface of a tread when new and, for example, on to the lateral faces of said tread or alternatively the molding of a cutout on a motif in relief which does not have a common lateral face with the lateral faces of the tread (in this case the cutout opens beneath the running surface on at least one of the lateral faces of said motif in relief to cause said cutout to communicate with another cutout adjacent said motif).

In practice, the demolding, that is to say, the operation consisting of extracting the molded tread from the mold after vulcanization, does not cause any particular problems. Advantageously, the molds and the sectors may be opened simultaneously without any risk of breaking the molded connecting elements. For certain geometries of the first elements in relief, preferably the molding is carried out in two stages, in a first stage by radially moving apart the various sectors bearing the second elements in relief and in a second stage by moving the shells apart from one another in the axial direction in order to extract the first elements in relief borne by said molds in order to terminate the demolding of the tread (thus these first elements are prevented from being inhibited in their movement by the second elements).

The first elements in relief may have geometries which are rectilinear or alternatively curved, depending on the desired shape of the channel, for example in order better to follow the transverse curvature of the reinforcement armatures of the ring of a tire. In the case of a first element in relief having a curved geometry of high curvature (that is to say one which does not extend essentially in the transverse direction of the tread), the mold bearing said element in relief may be advantageously mounted to pivot about its axis of symmetry in order to facilitate extraction of said element in relief.

Another form of mounting the first elements in relief on one of the shells consists in providing an appropriate number of holes on this shell, this number corresponding to the number of first elements, for introducing these first elements so that they project from the molding surface of said shell.

One and the same first element in relief borne by a shell may, furthermore, be provided to cooperate with a plurality of second elements in relief borne by one or more ring sectors, said second elements being functionally arranged with said first element to mold cutouts, the walls of which are connected by at least one rubber connecting element.

What has been described above for a tire mold applies similarly to the molding of a tread alone, whether or not this tread be in the form of a closed ring or alternatively that of a flat tread (the direction of its width corresponding to the transverse direction once said tread has been put in place on a tire).

To this end, there is proposed a mold for molding a tread comprising an upper outer face intended to form a running surface extended laterally by lateral faces, these lateral faces furthermore being connected by an inner face. This mold comprises, in the molding position:

- at least two mold parts defining a closed volume corresponding to the volume of the tread to be molded, said mold parts comprising molding surfaces molding the outer, inner and lateral faces of the tread,
- at least one first element in relief, intended to mold a channel opening on to at least one lateral face of the tread, cooperating with at least one second element in relief intended to mold an incision which opens on to at least one of the inner or outer surfaces of the tread, for molding a single cutout, said first and second elements being functionally arranged to define in total at least one orifice intended to allow the rubber mix forming the tread to pass through during the operation of molding said tread.

One variant of this mold consists in that a first element in relief molding a channel opening at least on to one lateral face of a tread cooperates with at least one second element in relief molding an incision which opens on to the outer surface and at least one third element in relief molding an incision which opens on to the inner surface. In this variant, the incisions molded by the second and third elements in relief are connected together by means of the channel molded by the first element in relief. In this case in point, at least one of the second or third elements in relief is functionally arranged with the first element in relief to define in total at least one orifice intended to allow the rubber mix to pass to form a connecting bridge connecting the walls of the cutout thus molded.

The invention will now be described with reference to the drawing of two embodiments, which are given solely by way of examples.

DESCRIPTION OF PREFERRED EMBODIMENTS

Figure 1:
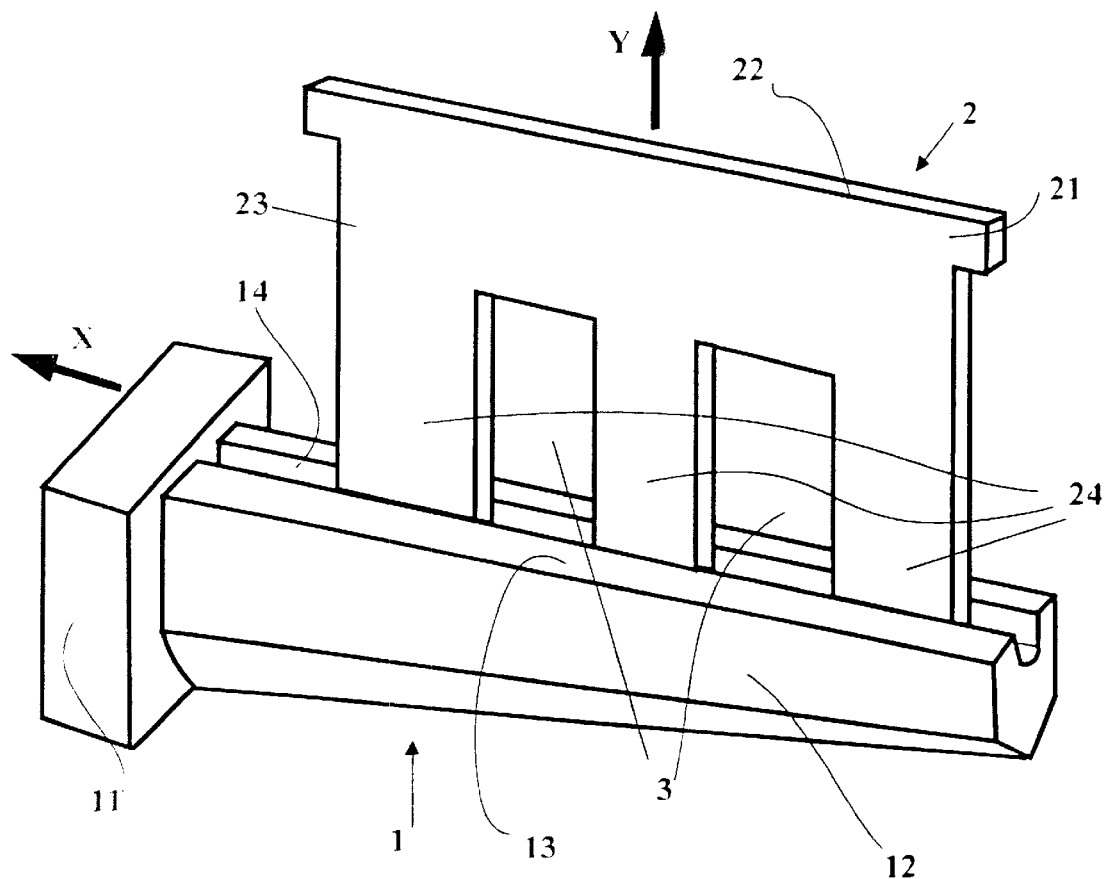
FIG. 1, shows, in the molding position, a first element in relief which cooperates with a second element in relief to mold a cutout provided with two connecting bridges.

In FIG. 1, there can be seen, in the molding position, a first element in relief 1 which cooperates with a second element in relief 2 to form a molding element for molding a cutout. In this FIG. 1, the constituent elements of the mold bearing said elements in relief are not shown. The first element 1 is formed of a base 11 on which is mounted a blade 12 of substantially rectilinear average profile in the direction perpendicular to the base 11, and one upper surface 13 of which is provided over its entire length with a groove 14. The element in relief 1 comprises a cross-section of an area which decreases from the base 11 to its opposite end so as to mold a channel having a variable section. The base 11 is provided to be mounted in a receptacle provided on the molding face of a shell (not shown in this figure) which is intended to mold a lateral surface of a tread which is extended by a sidewall of a tire.

The second element in relief 2 is in the form of a thin, substantially planar blade comprising a molding part 21 extended by an anchoring part 22 intended to be fixed to a mold sector (not shown) molding part for the running surface of a tread of a tire. The molding part 21 comprises an upper part 23, extending the anchoring part 22 and which itself is extended radially towards the axis of the mold by three blades 24 substantially of the same length.

Figure 3:
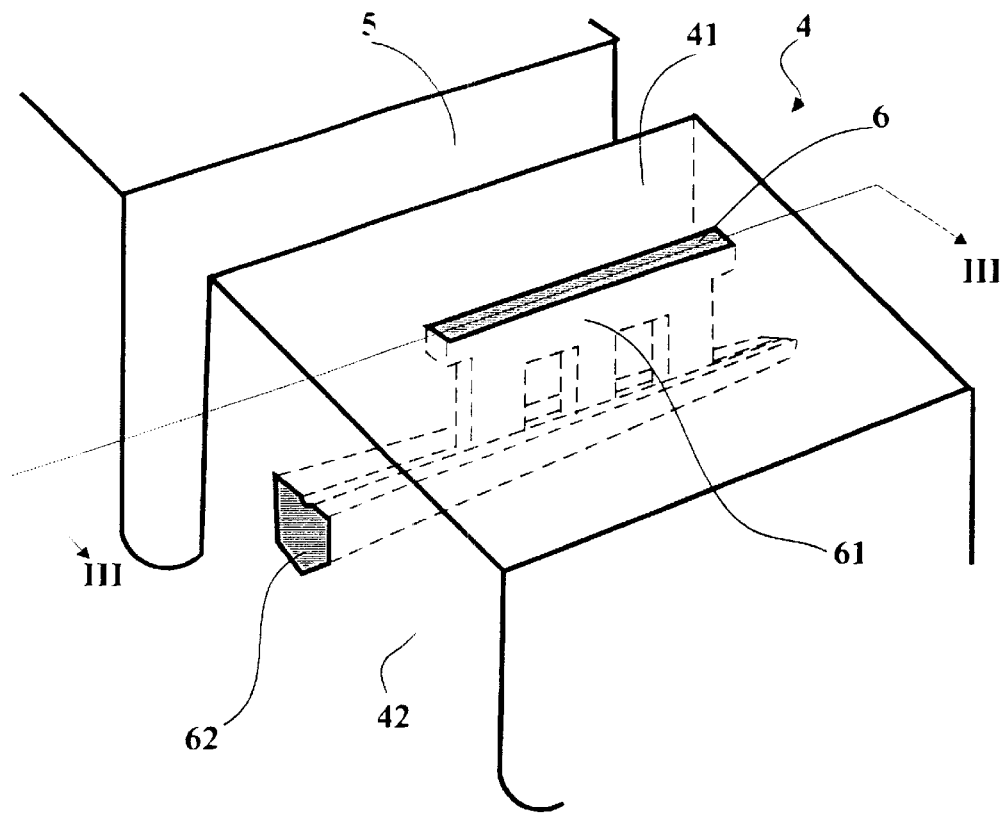
FIG. 3, shows a perspective view of a tread-pattern block located at the shoulder of a tread comprising a cutout molded with a molding element according to the invention.

In the molding position shown, the first and second elements in relief cooperate to form a molding element intended for molding a single cutout opening both on to the running surface of the tread and on to one of the lateral edges of said tread (as shown in FIG. 3), and secondly to define two orifices 3 intended to allow the rubber mix to pass during molding.

In the molding position shown, the three blades 24 of the second element in relief 2 opposite to the anchoring part 22 have their ends engaged in the groove 14 provided on the face 13 of the first element in relief 1, the width of this groove 14 being preferably selected to permit the introduction of the ends of the blades 24 with a suitable amount of play. In this manner, it is possible to ensure that the films of rubber mixes which might have been formed during the molding between the first and second elements in relief will be broken during the movements of said elements at the time of demolding the tire. Furthermore, this arrangement permits better cooperation between the two elements in relief during the molding operation and imparts to the assembly of said elements a sufficient rigidity during molding which thus ensures molding of a single cutout. This groove may also act as a guide for positioning one of the elements in relief relative to the other at the time of closing the mold in order to obtain the molding position.

Once a tire has been molded and vulcanized, it is demolded by displacing each mold sector radially towards the outside (in the direction of the arrow Y substantially perpendicular to the direction X representing the axial direction) in order to remove the second element 2 from the tread then by moving the shell bearing the first element 1 axially away relative to the other shell (in the direction of the arrow marked X); in the case in question, the two movements may equally well be effected in succession or at the same time.

In a variant which is not shown, provision is made furthermore for an element in relief which projects from the molding face of a mold sector to comprise a passage to permit the positioning by sliding of a first element in relief borne by a shell; this arrangement makes it possible for said first element to withstand the forces exerted by the uncured (non-vulcanized) rubber mix at the moment of penetration of said first element into the mixture.

Provision may be made for the first elements in relief to have a curvature so as to mold a channel, the average direction of which within the tread forms an angle other than zero with the axial direction of the tire. In this variant, the second element in relief which cooperates with this first element in relief is of course adapted to define at least one orifice with this first element.

Figure 2:
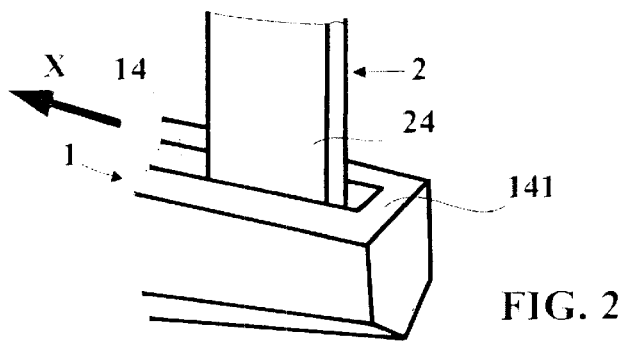
FIG. 2, shows a variant embodiment of a first element in relief which molds a channel.

Furthermore, to facilitate breaking of any rubber film molded in the clearance existing in the groove 14 between the blades 24 of the second element in relief 2 and the first element in relief 1, it is preferable for said groove 14 not to extend over the entire length of said first element in relief 1. As is shown in FIG. 2, the end part 141 of the element in relief 1 is devoid of groove, involving the breaking of the rubber films by said part 141 during the demolding movement of said element in relief in the direction X.

FIG. 3 shows a partial perspective view of the shoulder of a tread, when new, comprising a plurality of blocks 4 separated from each other in the circumferential direction by grooves 5 of transverse orientation. Each block 4 is provided with a cutout 6 molded with a molding element according to the invention and shown in FIG. 1, said cutout 6 being composed of an incision 61 which opens on to the contact surface 41 of the block when new and of a channel 62 radially extending said incision 61 towards the inside beneath the running surface until it opens on to a lateral face 42 of the block 4. The rubber walls defining the cutout 6 obtained by molding are connected mechanically by two rubber bridges, the sections of which on said walls have substantially rectangular geometries (which can be seen in FIG. 4).

Figure 4:
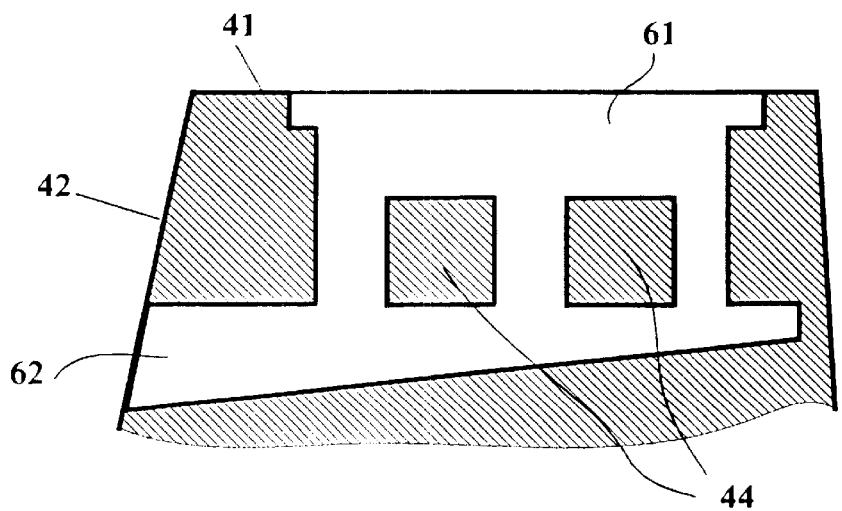
FIG. 4, shows a section taken along the line III—III of FIG. 3.

FIG. 4 shows a section taken along the line III—III of FIG. 3; in this FIG. 4, there can be seen the trace of the axially outer face 42 of the block 4 which is provided with a cutout 6 formed of the incision 61 which opens on to the running surface 41 extended by the channel 62 which opens on to the lateral face 42 of the tread. There can also be seen the intersections 44 of the connecting bridges between the main walls of the cutout with one of said walls.

One variant embodiment consists in using one and the same first element in relief to mold a channel in the edge of a tread and also in a tread pattern motif axially to the inside of said edge (that is to say separated from said edge by a substantially circumferential cutout).

Figure 5:
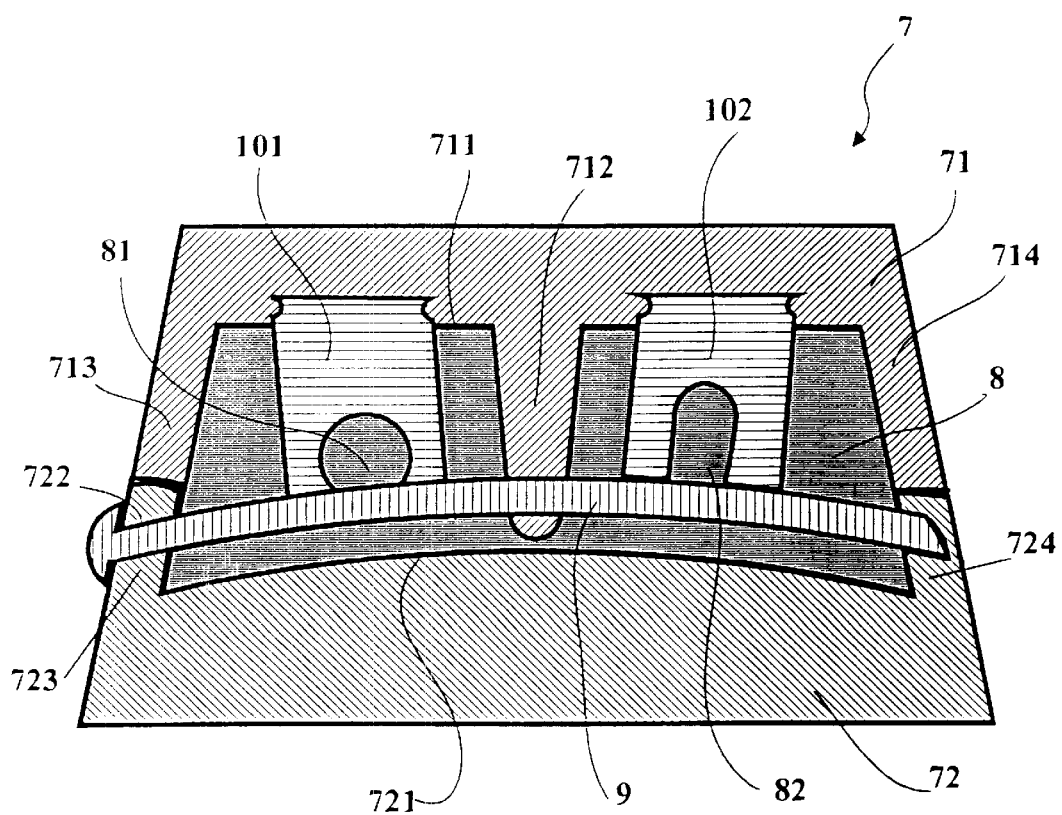
FIG. 5, shows a section through a mold according to the invention which is intended for molding a rubber tread.

FIG. 5 shows in part a cross-section through a mold 7 for molding a rubber tread 8 intended, for example, to be placed on a new tire or a tire which is to be renovated, or alternatively to be used for the manufacture of a caterpillar track. The mold shown is formed of two parts forming a first die 71 and a second die 72 intended to come into contact with each other when the mold is closed in the molding position for said tread. Each die 71, 72 is provided with a molding surface, 711 and 721 respectively, for molding the outer, inner and lateral surfaces of said tread; the molding surfaces of each die, when the mold is closed, define an inner molding volume equal to the volume of the tread to be molded.

Furthermore, the upper die 71 is provided with an element in relief in the form of a rib 712 on its molding surface 711 for molding a groove in the tread, this groove having a depth substantially less than the thickness of the tread and being oriented in the longitudinal direction of the tread.

Each die 71 and 72 comprises lateral parts 713, 714 and 723, 724 respectively, bearing two against two in order to close the mold 7 completely in the molding configuration; these lateral parts comprise molding surfaces for molding the lateral parts of a tread.

One of the lateral parts 723 of the lower die 72 comprises at least one orifice 722 for a first element in relief 9 of curved geometric shape to pass through in the plane of the figure; this element in relief 9 extends over the entire width of the tread 8 to come to bear in a receptacle provided on the other lateral part 724 of the same die 72, and is intended to mold a channel of substantially circular section within the tread 8. This same element passes into an orifice formed in the rib 712 which is borne by the upper die 71, which makes it possible to reinforce the flexural strength of said element when subject to the molding forces while ensuring the guidance thereof.

Two blades 101, 102 are anchored in the die 71 so as to project from the molding surface of said die to mold two incisions in the rubber tread 8. These two blades 101, 102 are arranged so as to come to bear on the first element in relief 9 in the molding configuration and each to define with said element in relief an orifice, 81, 82 respectively, for the rubber to pass through during the molding of the tread 8.

For practical reasons, each die 71, 72 may be formed of a plurality of unit dies assembled together in a manner known per se. The mold according to the invention may also be formed of a plurality of unit dies to form two concentric annular dies, the first die being placed radially to the inside of the second to mold a rubber tread in the form of a closed annular tread.

One variant consists in producing, instead of an orifice passing through the rib 712, a sort of notch on the rib 712 for guiding the element in relief 9 and in which this element comes to bear against said rib; this latter variant having the advantage of permitting demolding by opening the upper die in a first stage, followed by the extraction of the element in relief 9.

We claim:
1. A mold for molding a tire provided with a tread of rubber mix, this tread having a running surface and two lateral faces axially defining said tread, said mold comprising in the molding configuration:
   a peripheral ring formed of sectors having a molding surface for molding at least the running surface of the tread, each sector being movable towards or away from the axis of the mold,
   two shells concentric to the peripheral ring, each having a molding surface for molding a lateral face of the tread, these shells being movable in the direction of the axis of the mold towards or away from each other, at least one first element in relief projecting from the molding surface of at least one of said shells for molding a channel beneath the running surface of the tread, at least one second element in relief projecting from the molding surface of a sector of the ring for molding a cutout in the tread, this mold being characterized in that, in the molding configuration, said at least one first element in relief borne by said at least one shell cooperates with said at least one second element in relief borne by said sector to form a molding element for molding in at least one motif in relief of the tread pattern a cutout opening on to the running surface of the tread, said cutout being extended to the inside of the tread by a channel opening on to at least one lateral face of the motif in relief, said first and second elements in relief forming at least one orifice which is entirely defined by said first and second elements in relief, each orifice thus formed permitting the rubber mix to pass during molding to form a connecting element between walls defining the cutout molded by said molding element.

2. A mold according to claim 1 wherein said at least one first element in relief is provided with a groove for receiving an end of said at least one second element in relief for ensuring cooperation between said two elements during the molding operation.

3. A mold according to claim 1 wherein at least one of the shells is formed of two concentric rings assembled such that the ring bearing the first elements in relief can rotate relative to the other ring to facilitate demolding of the vulcanized tire.

4. A mold according to claim 1 wherein at least one of the shells bearing said first elements in relief is provided with holes intended to allow introduction of said first elements in relief so that they project from the molding surface of said shell.

5. A mold for molding a tread comprising an outer face forming a contact surface, extended laterally by lateral faces, these lateral faces furthermore being connected by an inner face, the mold comprising, in the molding position:

at least two mold parts defining a closed volume corresponding to the volume of the tread to be molded, said mold parts having molding surfaces for molding the outer, inner and lateral faces of the tread, at least one first element in relief for molding a channel opening on to at least one lateral face of the tread, cooperating with at least one second element in relief for molding an incision which opens on to at least one of the inner or outer surfaces of the tread, for molding a single cutout, said first and second elements defining at least one orifice to allow the rubber mix forming the tread to pass through during the operation of molding said tread.

6. A mold according to claim 5 wherein said one first element in relief molding a channel opening at least on to one lateral face of a tread cooperates with said at least one second element in relief molding an incision which opens on to the outer surface of the tread and at least one third element in relief molding an incision which opens on to the inner surface to mold a single cutout, the incisions molded by the second and third elements in relief being connected together by means of the channel, and in that, at least one of the second or third elements in relief is arranged with the first element in relief to define at least one orifice to allow the rubber mix to pass to form a connecting bridge connecting walls defining the cutout.

* * * * *

UNITED STATES PATENT AND TRADEMARK OFFICE
CERTIFICATE OF CORRECTION

PATENT NO. : 6,461,135 B1
DATED : October 8, 2003
INVENTOR(S) : Lagnier et al.

It is certified that error appears in the above-identified patent and that said Letters Patent is hereby corrected as shown below:

<u>Title page,</u>
Item [57], ABSTRACT,
Lines 4 and 5, "on to" should read -- onto --

<u>Column 1,</u>
Line 63, "on to" should read -- onto --

<u>Column 2,</u>
Lines 9, 10, 40, 42 and 53, "on to" should read -- onto --
Line 32, "tread," should read -- tread, and --

<u>Column 3,</u>
Lines 47, 55, 57 and 59, "on to" should read -- onto --

<u>Column 4,</u>
Line 6, "FIG. 1," should read -- FIG. 1 --
Line 9, "FIG. 2," should read -- FIG. 2 --
Line 11, "FIG. 3," should read -- FIG. 3 --
Line 15, "FIG. 4," should read -- FIG. 4 --
Line 17, "FIG. 5," should read -- FIG. 5 --

<u>Column 5,</u>
Lines 45, 48, 57 and 58, "on to" should read -- onto --

<u>Column 7,</u>
Line 6, "tread," should read -- tread, and --
Lines 15 and 17, "on to" should read -- onto --

UNITED STATES PATENT AND TRADEMARK OFFICE
CERTIFICATE OF CORRECTION

PATENT NO. : 6,461,135 B1
DATED : October 8, 2003
INVENTOR(S) : Lagnier et al.

It is certified that error appears in the above-identified patent and that said Letters Patent is hereby corrected as shown below:

<u>Column 8,</u>
Lines 13, 15, 22 and 26, "on to" should read -- onto --
Line 24, "on" should read -- onto --
Line 25, "to" should be deleted
Line 29, "that," should read -- that --

Signed and Sealed this

Third Day of June, 2003

JAMES E. ROGAN
*Director of the United States Patent and Trademark Office*